(12) United States Patent  
Owen

(10) Patent No.: US 7,546,811 B2  
(45) Date of Patent: Jun. 16, 2009

(54) COMPUTER TESTING PLATFORM

(76) Inventor: Bernie A. Owen, 165 SW. Viola Rd., El Dorado, KS (US) 67042

(*) Notice: Subject to any disclaimer, the term of this patent is extended or adjusted under 35 U.S.C. 154(b) by 284 days.

(21) Appl. No.: 11/183,103

(22) Filed: Jul. 18, 2005

(65) Prior Publication Data

US 2007/0012227 A1    Jan. 18, 2007

(51) Int. Cl.
   *A47B 47/00* (2006.01)
(52) U.S. Cl. .............. 108/180; 108/193; 108/50.01
(58) Field of Classification Search .......... 108/180, 108/193, 159, 157.13, 50.01, 50.02, 101; 211/186; 312/223.3, 257.1, 263, 265.5
   See application file for complete search history.

(56) References Cited

U.S. PATENT DOCUMENTS

| | | | |
|---|---|---|---|
| D147,534 S * | 9/1947 | Cutrow | D6/485 |
| 2,860,404 A | 11/1958 | Alden | |
| 3,069,216 A * | 12/1962 | Vaeth | 312/195 |
| 3,807,572 A * | 4/1974 | Luvara et al. | 211/10 |
| 3,862,785 A | 1/1975 | Scheerhorn et al. | |
| D236,781 S * | 9/1975 | Cowley | D6/436 |
| 4,272,136 A | 6/1981 | Sengua | |
| D260,716 S * | 9/1981 | Cohen et al. | D6/474 |
| 4,305,628 A | 12/1981 | Glasener | |
| 4,582,002 A * | 4/1986 | Wright | 108/60 |
| 4,754,397 A | 6/1988 | Varaiya et al. | |
| 4,807,539 A * | 2/1989 | Del Castillo von Haucke | 108/60 |
| 4,949,853 A | 8/1990 | Klein et al. | |
| 5,011,228 A * | 4/1991 | Marcantel | 297/440.13 |
| D329,756 S * | 9/1992 | Gandy | D6/338 |
| 5,481,987 A | 1/1996 | Maitland | |

* cited by examiner

*Primary Examiner*—Janet M Wilkens  
(74) *Attorney, Agent, or Firm*—Boyd D. Cox

(57) ABSTRACT

A computer testing platform for supporting computer hardware components in a highly visible and readily accessible manner for diagnostic testing and repair includes a housing made from clear acrylic plastic and a plurality of bays for storing the components. The bays are formed by removable shelving disposed vertically and horizontally within the housing.

14 Claims, 4 Drawing Sheets

COMPUTER TESTING PLATFORM

BACKGROUND

The present invention is directed to a computer testing platform for supporting computer hardware such that the hardware components of the computer are accessible for testing and repair work. The computer testing platform allows the hardware components supported thereon to function as an operable computer, while individual components can be readily added, removed and interchanged for other components.

A computer can malfunction from time to time making it necessary to replace or repair the computer or component parts of the computer. Diagnostic testing of the hardware and software can also be required when reinstating the computer to an operable condition.

Typically, the hardware components of a computer are contained in a protective casing or cabinet. The protective casing generally covers and hides the computer components making it difficult to see and access those components. Since diagnostic testing and/or repair work generally require that the technician be able to see and reach the hardware components of the computer, it is necessary to remove the components from the casing or cabinet.

Once removed from the protective casing, the computer components can be difficult to maintain in a useable configuration. The loose components are more likely to be scattered, damaged, or lost. Therefore, it is desirable to have a device for mounting computer components in which the components are secured and maintained as a unit, yet are still visible and readily accessible. Also, there is a need for a support platform for a computer used in an industrial environment in which the components are readily accessible and easily interchanged without having to remove the computer from a protective casing each time access or interchanging is required.

When teaching computer repair and maintenance, it is desirable to maintain a high degree of visibility of the computer components in order for students to observe the process. By providing visual aids in a classroom, the student's understanding of the diagnostic/repair process on a computer can be greatly improved. Therefore, a platform for mounting a computer in such a way that the computer components are visible and readily accessible while allowing the computer to function in its full capacity is needed.

When testing or repairing a computer, it may be necessary to interchange one computer component part for another. By reducing the time required to exchange one component for another, the time for testing or repairing the computer can be reduced and the efficiency of repairing the computer can be increased. Consequently, there is a need for a computer testing platform in which one component can be quickly and easily interchanged with another component.

The computer testing platform of the present invention enables the computer's hardware, software utilities and other software programs to be tested and the hardware components quickly changed out or repaired while maintaining the computer's ability to function.

SUMMARY

The present invention is a computer testing platform for supporting a computer and/or computer components in a highly visible and easily accessible manner wherein the platform can be readily modified to accommodate various models of computers and components.

It is an object of the present invention to provide a support platform for a computer and/or computer components that allows direct access to the computer components.

It is a further object of the present invention to provide a support platform for removeably mounting computer components in an orderly arrangement.

It is a further object of the present invention to provide a support platform for a computer in which the computer components can be readily interchanged.

It is a further object of the present invention to provide a computer testing platform for supporting a computer undergoing diagnostic testing.

It is a further object of the present invention to provide a platform for supporting a computer used for testing computer hardware, software utilities and other software programs.

It is a further object of the present invention to provide a platform for supporting a computer in which the components are displayed in a highly visible manner.

It is a further object of the present invention to provide a platform for supporting computer components wherein the individual components can be easily accessed and manipulated by a technician.

It is a further object of the present invention to provide a platform for supporting a computer wherein the supported components can be easily installed and removed from the platform.

It is a further object of the present invention to provide a computer testing platform for supporting a computer which can be used for teaching diagnostic testing and/or computer repair.

Computers are generally connected to a power source by an electrical wire or wires. Also, the computer components are generally connected to each other by a myriad of wires. The computer testing platform of the present invention has an open bay arrangement in which all of the bays are opened to each other within the housing's interior area. The open bay arrangement accommodates the wires extending within the housing and the wires extending between the inside and outside of the housing.

The computer testing platform can be easily upgraded by varying the size of the platform and the number of bays to accommodate different computer configurations. In addition, the computer components can be mounted on the testing platform such that the combination of components can function as a fully operational computer.

Finally, the testing platform can be used when testing hardware including CD Roms, floppy drives, hard drives, video cards, modems, printers, PCS, USC, AGP devices and motherboard sockets. It can also be used when testing overclocking motherboards, processors, video cards and memory and for hard drive set-up and burn-in.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
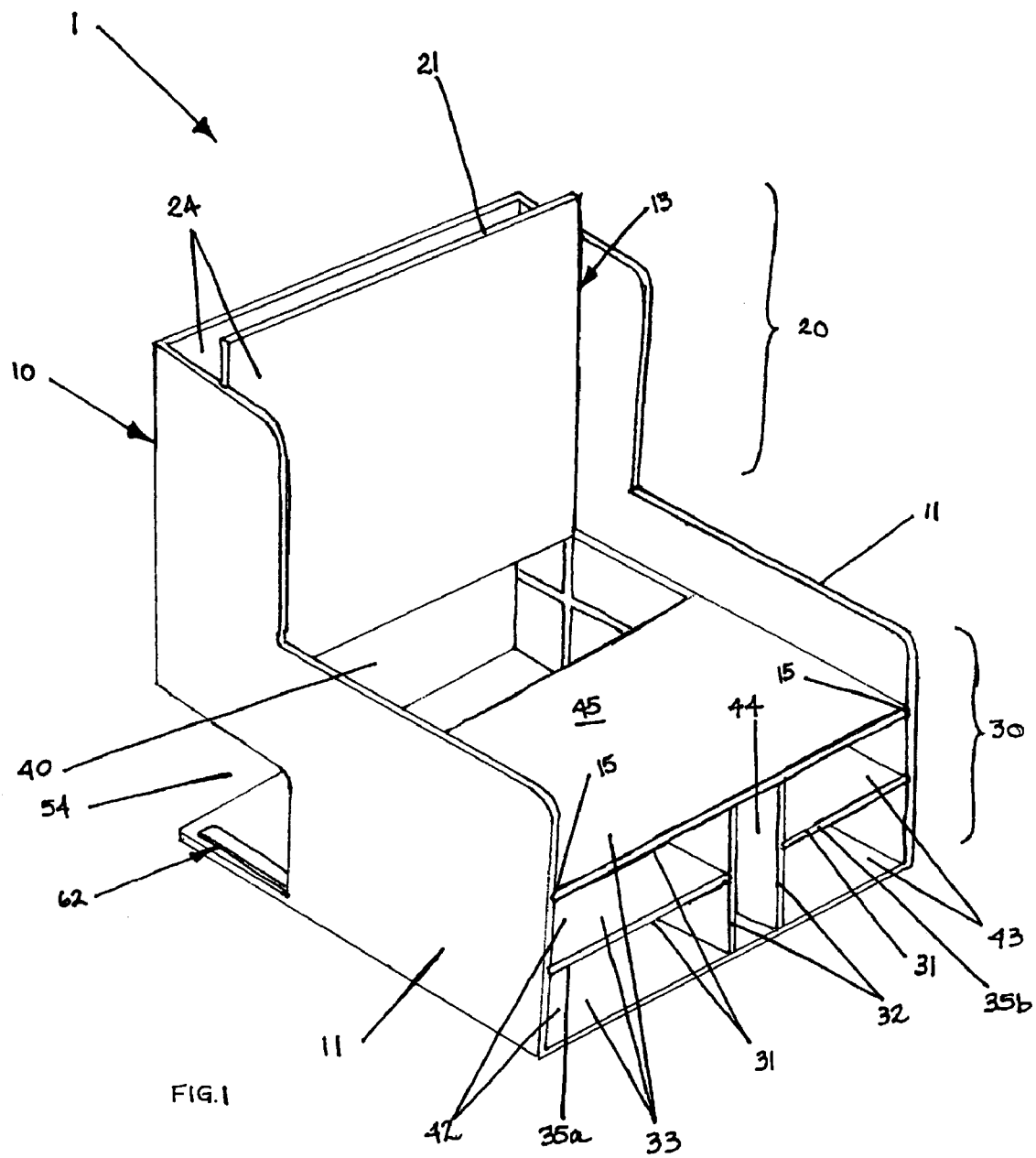
FIG. 1 is a perspective front view of a preferred embodiment of the computer testing platform of the present invention.
Figure 2:
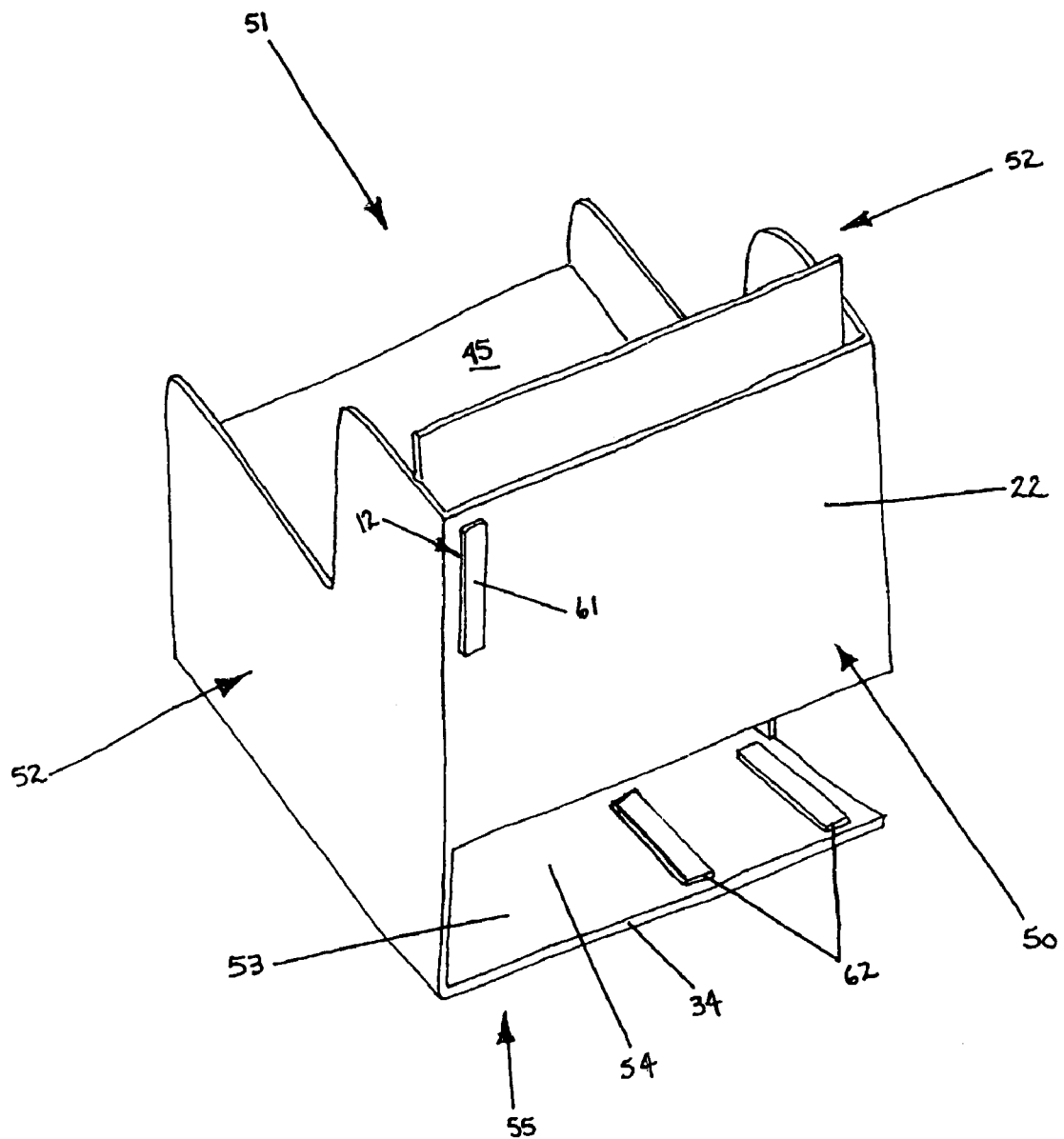
FIG. 2 is a perspective rear view of the computer testing platform of FIG. 1.
Figure 3:
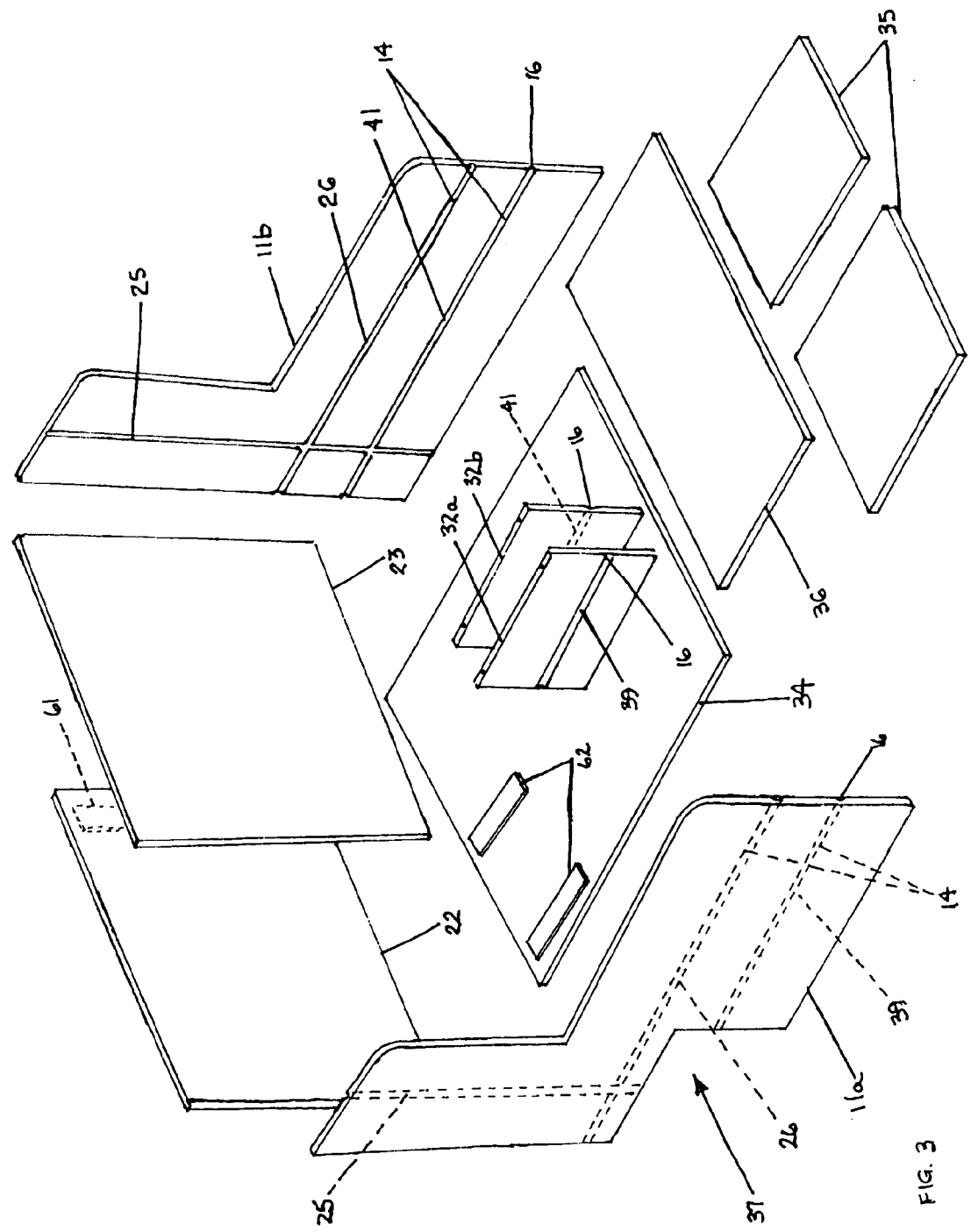
FIG. 3 is an exploded perspective view of the computer testing platform of FIG. 1 showing a first embodiment of the motherboard plate.

The computer testing platform 1 as shown in FIGS. 1-3 includes a housing 10, vertical 21 and horizontal 31 plates and means for removably mounting plates in the housing.

The housing 10 is formed by a back 50, a front 51, sides 52, and a bottom 55. The sides 52 of the housing 10 are defined by end plates 11, while the bottom 55 is a base plate 34. The housing's back 50 is formed by a back plate 22 and an access opening 53. The housing 10 contains an interior area 40 which includes a vertical support portion 20 and a horizontal support portion 30.

Removably mounted in the interior area 40 of the vertical support portion 20 is a vertical plate 21. The vertical plate 21 is a motherboard plate. It not only divides interior area 40 of the vertical support portion 20 into vertical bays 24, but also supports at least one computer board thereon.

The horizontal support portion 30 houses a plurality of horizontal plates 31 and a central divider 32. The horizontal plates 31 and central divider 32 define a plurality of horizontal bays 33 within the horizontal support portion. The horizontal plates 31 include a plurality of intermediate bay plates 35 and a top bay plate 36, while the central divider 32 comprises left 32a and right 32b divider plates.

The end plates 11 include a left end plate 11a and a right end plate 11b, both having a generally L-shape which gives the housing 10 an L-shaped profile. The left end plate 11a includes a notch 37 therein.

The means for removably mounting plates comprise a vertical plate support 13 and a horizontal plate support 14. The vertical plate support 13 is formed by a pair of vertically elongated grooves 25. Each of the vertically elongated grooves 25 is disposed in a respective left 11a and right 11b end plate.

The horizontal plate support 14 includes upper 15 and lower 16 plate supports. The upper plate support 15 comprises a pair of upper horizontal grooves 26. The upper horizontal grooves 26 are positioned opposite each other and each is disposed in respective left 11a and right 11b end plates. The lower plate support 16 comprises a pair of lower left 39 and lower right 41 horizontal grooves.

The lower left horizontal grooves 39 are disposed opposite each other. One of the lower left horizontal grooves 39 is disposed in the left end plate 11a and the other lower left horizontal groove 39 is disposed in the left divider plate 32a. The pair of lower right horizontal grooves 41 are disposed opposite each other with one of the lower right horizontal grooves 41 being in the right end plate 11b and the other lower right horizontal groove 41 being in the right divider plate 32b.

In a preferred embodiment, the end plates 11, the divider plates 32a, 32b, the horizontal plates 31 and the vertical plate 21 are formed of transparent acrylic plastic, such as Plexiglass. Although the base plate 34 of the computer testing platform 1 is preferably made of transparent plastic, it could be made of other suitable opaque or translucent material instead.

The computer testing platform 1 has a plurality of fasteners for holding various articles on to the housing 10. Each of the fasteners are selectively releasable. These fasteners include a first releasable connector 61 and a second releasable connector 62. The first releasable connector 61 is a strip of hook and loop fastener, such as Velcro™. The strip is disposed on the back plate 22. The second releasable connector 62 is a plurality of strips of the hook and loop fasteners. It is mounted on an upper surface of the base plate 34 in the interior area 40 of the housing 10.

Each of the vertical 24 and horizontal 33 bays provide a separate storage area for computer components or other equipment within the housing's interior area 40. The bays 24, 33 have an open arrangement in which all of the bays 24, 33 are opened to the interior area 40 as well as opened to the outside of the housing 10.

The motherboard plate 23 when mounted in the housing 10 divides the interior area 40 of the vertical support portion 20 into a plurality of separate vertical bays 24.

The vertical plate support 13 mounts the motherboard plate 23 in the vertical support portion 20 of the housing 10. The vertically elongated grooves 25 in the left 11a and right 11b end plates each receive a respective opposing edge of the motherboard plate 23 therein. At least one computer board can be mounted on the motherboard plate 23. Consequently, the motherboard plate 23 and the computer boards attached thereto can be readily inserted into the housing 10 and readily removed therefrom. The vertical bays 24 are adapted to hold the computer board or boards that are attached to a motherboard plate 23 mounted in the housing 10.

In the horizontal support portion 30, the pair of upper horizontal grooves 26 engage the opposing edges of the top bay plate 36 when the top bay plate 36 is mounted in the horizontal support portion 30. The top bay plate 36 has an upper work surface 45 that is generally planar and horizontally disposed when installed in the housing 10. The upper work surface 45 is adapted for supporting various computer components thereon. In addition, the top bay plate 36 can be removed when additional access to the lower bays 42,43 is desired.

In the interior area 40, the central divider 32 separates the horizontal support portion 30 into a lower left bay 42 and a lower right bay 43. A rear horizontal bay 54 comprises part of the interior area 40. The rear horizontal bay 54 is located beneath the vertical bay(s) 24 in the interior area 40 and between the back 50 of the housing 10 and a back edge of the horizontal plates 31. Due to its size, the rear horizontal bay 54 can support larger-sized computer components and equipment. The horizontal 33 and vertical 24 bays open into the rear horizontal bay 54. The access opening 53 and notch 37 provide direct access into the rear horizontal bay 54. This allows a technician easy access to the components supported therein and further provides an opening for wiring to extend into the interior area 40 of the housing 10.

Each pair of the left 39 and right 41 horizontal grooves slideably supports a respective left 35a and right 35b intermediate bay plate. By receiving opposing edges of the left intermediate plate 35a therein, the lower left horizontal grooves 39 can releasably hold the plate 35a in the horizontal support portion 30. Similarly, opposing edges of the right intermediate bay plate 35b are received into respective ones of the right lower horizontal grooves 41. Consequently, both the left 35a and right 35b lower horizontal bay plates can be readily inserted and removed from the housing 10.

Each of the intermediate bay plates 35 is adapted to support computer components thereon. The base plate 34 can also support computer components on its upper surface. The horizontal bays 33 are disposed within the horizontal support portion 30 and are defined by the positions of the horizontal plates 31 and the left 32a and right 32b divider plates. The horizontal bays 33 house the components supported on the intermediate bay plates 35 as well as components on the base plate 34.

When engaged, the second releasable connector 62 positively secures the supported components to the base plate 34. The first releasable connector 61 can secure wire(s), cable bundles, power supply devices or other equipment to the housing 10.

The access opening 53 on the back 50 of the housing 10 extends between a lower edge of the back plate 22 and a back edge of the base plate 34. The access opening 53 cooperates with the interior area 40 of the housing 10. The notch 37, disposed in the left end plate 11*a* of the housing 10, is contiguous with the access opening 53. The notch 37 and the access opening 53 both provide communication between the interior area 40 of the housing 10 and the area outside of the housing 10.

The top bay plate 36 extends the full width of the housing 10 and is larger widthwise than the intermediate bay plates 35. However, the sizes of the housing, plates and bays can be varied to accommodate different computer parts and models.

The horizontal support portion 30 provides a base for the computer testing platform 1. The vertical support portion 20 extends upwardly from the horizontal support portion 30. Within the interior area 40 of the housing 10, the vertical support portion 20 is separated into two discrete vertical bays 24 when the motherboard plate 23 is positioned in the vertical plate support of the vertical support portion 20. However, when the motherboard plate 23 is removed from the housing 10, the configuration of interior area in the vertical support portion 20 changes such that there is only one vertical bay 24 in the vertical support portion 20. Therefore, the motherboard plate 23 can be selectively removed and inserted into the housing 10 to change the configuration and number of vertical bays 24.

When installed in the horizontal support portion 30, the top bay plate 36 and the two intermediate bay plates 35 divide the housing into a plurality of horizontal bays 33. The horizontal bays 33 can be arranged into various configurations by selective installation and removal of the horizontal plates 31 within the horizontal support portion 30 of the housing 10. For example, an intermediate bay plate 35 can be removed to provide a larger storage space in one of the lower left 42 or right 43 bays. Therefore, the number and sizes of the horizontal bays 33 and vertical bay(s) can be selectively varied, if desired.

To mount a computer board on the computer testing platform 1, the motherboard plate 23 is removed from the interior area 40 of the vertical support portion 20 by sliding the plate 23 in a direction away from the base plate 34. With the motherboard plate 23 removed from the vertical support portion 20, full access to the motherboard plate 23 is allowed. The computer board is attached to the motherboard plate 23 and the motherboard plate 23 is then reinserted into the housing 10.

The motherboard plate 23 is inserted into the vertical plate support 13 by first aligning two opposing edges of the motherboard plate 23 with the vertically elongated grooves 25 in the respective left 11*a* and right 11*b* end plates. With the plate's edges aligned with the vertically elongated grooves 25, the motherboard plate 23 is moved so that the edges slide into the vertically elongated grooves 25 until the plate 23 is at least partially disposed in the vertical support portion 20 of the housing 10.

Wires or cables from the components supported on the computer testing platform 1 can be extended through the access opening 53 and notch 37. The open arrangement of the horizontal 33 and vertical 24 bays allows wiring connections between the components, equipment and a power supply.

The computer testing platform of the present invention can hold the components of a computer in such a way that those components are visible and readily accessible to the technician. Diagnostic testing and training can be done on the computer with the computer's components in view of the technician(s) and/or students. When necessary the components can be quickly changed out by simply removing the component from the computer testing platform and inserting the substitute component. The motherboard plate with an attached computer board can be easily removed and another motherboard plate can be reinserted in its place. With the motherboard plate being readily interchangeable with other motherboard plates, the computer boards can be quickly changed out when necessary. This can decrease the time required for testing and repairing the computer. Also, the motherboard plate can be easily removed from the housing in order to more easily access a computer board attached thereto.

Figure 4:
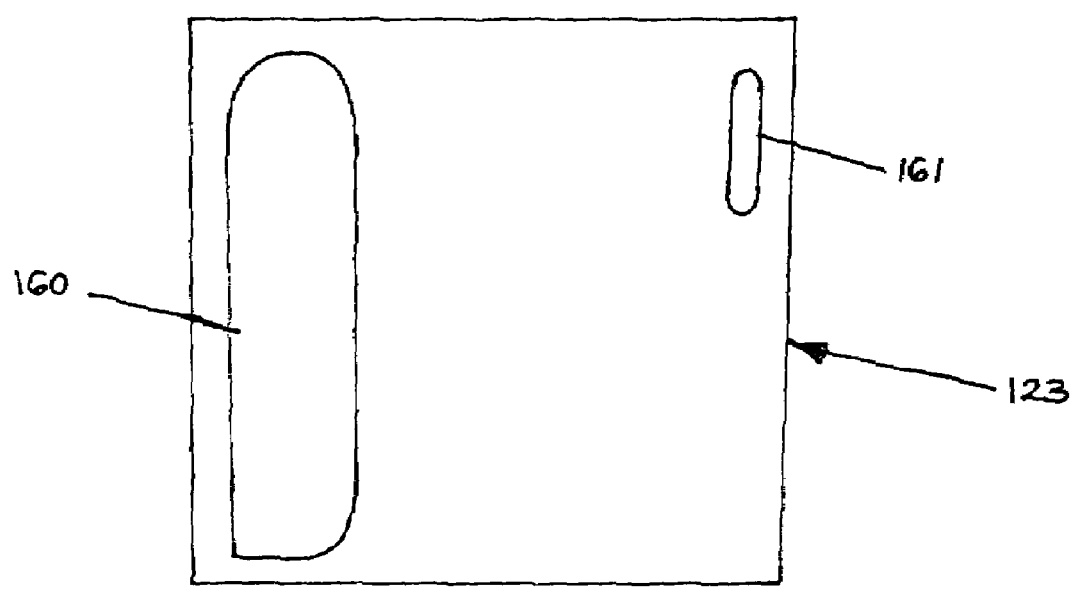
FIG. 4 is a front planar view of a second embodiment of the motherboard plate which can be interchanged on the computer testing platform of FIG. 1 with the motherboard plate of the first embodiment.

A second embodiment of the motherboard plate 123 of the present invention is shown in FIG. 4. This motherboard plate 123 can be removably mounted in the vertical plate support of the housing in a manner similar to the first embodiment. The motherboard plate 123 has at least one plate aperture 160 and a handle 161. The handle 161 is an elongate opening positioned alongside an edge of the plate 123. The handle 161 provides means by which a technician can grasp and manipulate the plate, thereby facilitating the insertion and removal of the motherboard plate 123 from the housing. The plate aperture 160 can accommodate wiring. Wires can pass through the plate apertures 160 within the interior area of the housing.

In addition, the motherboard plates 23, 123 of the first and second embodiments can be interchanged with each other on the computer testing platform of the present invention.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A computer testing platform for supporting computer components undergoing diagnostic testing and/or repair, the computer testing platform comprising:
    a housing comprised of transparent plastic and having a generally L-shaped profile;
    a vertical plate;
    a plurality of horizontal plates disposed generally perpendicular to the vertical plate mounted in the housing;
    a vertical plate support for removably mounting the vertical plate in the housing; and
    a horizontal plate support for removably mounting the horizontal plates in the housing;
    said housing further comprises an interior area which includes a horizontal support portion and a vertical support portion extending upwardly from the horizontal support portion;
    the housing further comprises left and right end plates, a base plate, a back plate, and an access opening;
    wherein said back plate extends between the left and right end plates, and said access opening extends between the left and right end plates and between a lower edge of the back plate and the base plate, and said base plate supports said left and right end plates and said back plate;
    said vertical plate support comprises two vertically elongated grooves, wherein the vertically elongated grooves are positioned opposite each other and are longitudinally aligned; one of the vertically elongated grooves is disposed in the left end plate and the other of the vertically elongated grooves is disposed in the right end plate;

said vertical plate is removably mounted in the vertical support portion and is adapted to support at least one computer component thereon;

wherein opposing edges of the vertical plate are each received within a respective vertically elongated groove when the vertical plate is mounted in the housing;

said vertical support portion includes at least one vertical bay for receiving at least one computer component therein;

said plurality of horizontal plates includes a removable top bay plate and a plurality of removable intermediate bay plates;

said top bay plate has an upper generally planar work surface;

said housing further comprises left and right divider plates extending upwardly from the base plate;

wherein said plurality of horizontal plates are mounted by the horizontal plate support within the horizontal support portion;

said horizontal plate support comprises two upper horizontal grooves, two lower left horizontal grooves and two lower right horizontal grooves; wherein said upper horizontal grooves and said left and right lower horizontal grooves extend longitudinally in a direction that is generally perpendicular to the vertically elongated grooves;

wherein said upper horizontal grooves are disposed opposite each other in longitudinal alignment;

one of said upper horizontal grooves is disposed in the left end plate and the other one of said upper horizontal grooves is disposed in said right end plate, and opposing edges of said top bay plate are each received within a respective upper horizontal groove when the top bay plate is mounted within the horizontal plate support;

said lower left horizontal grooves are disposed opposite each other in longitudinal alignment; one of the lower left horizontal grooves is in the left end plate and the other one of the lower left horizontal grooves is in the left divider plate; opposing edges of the left intermediate bay plate are each received within a respective lower left horizontal groove when the left intermediate bay plate is mounted in the horizontal plate support;

said lower right horizontal grooves are disposed opposite each other in longitudinal alignment; one of the lower right horizontal grooves is in the right end plate and the other one of the lower right horizontal grooves is in the right divider plate; opposing edges of the right intermediate bay plate are received within a respective lower right horizontal groove when the right intermediate bay plate is mounted in the horizontal plate support;

the horizontal plates separate the horizontal support portion into an upper bay, at least one lower left bay, at least one lower right bay, and a rear bay, wherein said upper bay is disposed above said top bay plate, said at least one lower left horizontal bay is disposed between the left end plate and the left divider, said at least one right horizontal bay is disposed between the right end plate and the right divider, and said rear bay is disposed between both of the lower horizontal bays and the access opening;

said left end plate has a notch therein;

said access opening is contiguous with said notch, and said access opening and said notch are continuous between the interior area and an area outside of the housing to provide access between the interior area of the housing and an area outside of the housing.

2. The computer testing platform of claim 1, further comprising a first releasable connector on the back plate and a second releasable connector on the base plate, wherein said first releasable connector comprises a hook and loop fastener and said second releasable connector comprises a plurality of hook and loop fasteners, wherein each of the hook and loop fasteners of the second releasable connector are disposed proximate the access opening and are generally parallel to each other.

3. The computer testing platform of claim 1, wherein said at least one vertical bay comprises a plurality of vertical bays, said vertical plate is removable from and insertable into said vertical plate support to selectively change the configuration of the vertical bays in the vertical support portion and each of said horizontal plates are selectively removable from and insertable into the horizontal plate support to selectively change the configuration of the horizontal bays in the horizontal support portion.

4. The computer testing platform of claim 1, wherein said vertical plate includes a handle and a plate aperture.

5. A computer testing platform comprising:
a housing;
a vertical plate removably mounted in the housing;
a plurality of horizontal plates removably mounted in the housing and disposed generally perpendicularly to the vertical plate mounted in the housing;
a vertical plate support; and
a horizontal plate support;
said housing comprises an interior area which includes a horizontal support portion and a vertical support portion;
said vertical support portion extending upwardly from the horizontal support portion;
said vertical plate support comprises two vertically elongated grooves disposed in the vertical support portion of the housing;
said housing further comprises left and right end plates, wherein one of the vertically elongated grooves is disposed in the left end plate and an other of the vertically elongated grooves is disposed in the right end plate; and opposing edges of the vertical plate being received within a respective vertically elongated groove when the vertical plate is mounted in the housing;
said plurality of horizontal plates includes a removable top bay plate;
said horizontal plate support comprises a plurality of horizontal grooves;
said plurality of horizontal grooves includes two upper horizontal grooves, wherein one of said upper horizontal grooves is disposed in said left end plate and the other of said upper horizontal grooves is disposed in said right end plate, said upper horizontal grooves are longitudinally aligned and positioned opposite each other in said housing; and
opposing edges of the top bay plate are each received within a respective upper horizontal groove when the top bay plate is mounted in the horizontal plate support.

6. The computer testing platform of claim 5, wherein said vertical support portion includes at least one vertical bay for receiving computer components therein.

7. The computer testing platform of claim 5, wherein said plurality of horizontal grooves extend longitudinally in a direction that is generally perpendicular to the vertically elongated grooves.

8. The computer testing platform of claim 5, wherein said top bay plate has an upper generally planar work surface.

9. The computer testing platform of claim 5, wherein the horizontal plates separate the horizontal support portion into a plurality of horizontal bays for receiving computer components therein.

10. The computer testing platform of claim 5, said housing further comprises a back plate and a base plate, wherein said base plate supports the end plates and back plate; and said plurality of horizontal plates further comprises at least one intermediate bay plate removably mounted in the horizontal support portion in a location between the top bay plate and the base plate.

11. The computer testing platform of claim 10, wherein said housing further comprises a central divider extending upwardly from the base plate in the horizontal support portion;

said plurality of horizontal grooves further comprising a plurality of lower horizontal grooves, wherein one of said lower horizontal grooves is disposed on one of said end plates and the other of the lower horizontal grooves is disposed on said divider;

opposing edges of the at least one intermediate bay plate are received within a respective one and other of the lower horizontal grooves.

12. The computer testing platform of claim 10, further comprising first and second releasable connectors, wherein said first releasable connector is disposed on said back plate and said second releasable connector is disposed on said base plate.

13. The computer testing platform of claim 5, wherein said left and right end plates are generally L-shaped.

14. The computer testing platform of claim 5, wherein said housing is comprised of transparent plastic.

* * * * *